United States Patent [19]
Hofmann et al.

[11] Patent Number: 5,854,814
[45] Date of Patent: Dec. 29, 1998

[54] DIGITAL TRANSMISSION SYSTEM WITH IMPROVED DECODER IN THE RECEIVER

[75] Inventors: Rudolf Hofmann, Forchheim; Wolfgang Brox, Kalchreuth, both of Germany

[73] Assignee: U.S. Philips Corporation, New York, N.Y.

[21] Appl. No.: 696,938
[22] PCT Filed: Dec. 15, 1995
[86] PCT No.: PCT/IB95/01134
 § 371 Date: Aug. 23, 1996
 § 102(e) Date: Aug. 23, 1996
[87] PCT Pub. No.: WO96/20546
 PCT Pub. Date: Jul. 4, 1996

[30] Foreign Application Priority Data

Dec. 27, 1994 [DE] Germany ................... 44 46 558.0

[51] Int. Cl.⁶ .................................................. H03D 1/00
[52] U.S. Cl. .................. 375/340; 375/342; 364/724.19; 704/220
[58] Field of Search .................................. 375/340, 350, 375/285, 232; 371/41, 37.8, 37.1; 395/2.25, 2.26, 2.28, 2.29, 2.32, 2.36, 2.37, 2.42; 364/724.011, 724.19

[56] References Cited

U.S. PATENT DOCUMENTS

| | | | |
|---|---|---|---|
| 4,980,916 | 12/1990 | Zinser | 395/2.29 |
| 5,127,053 | 6/1992 | Koch | 395/2.16 |
| 5,299,281 | 3/1994 | Coolegem | 704/219 |
| 5,359,696 | 10/1994 | Gerson et al. | 395/2.32 |
| 5,602,961 | 2/1997 | Kolnesnik et al. | 395/2.32 |

Primary Examiner—Stephen Chin
Assistant Examiner—Joseph Roundtree
Attorney, Agent, or Firm—Dicran Halajian

[57] ABSTRACT

A digital transmission system, such as a mobile radio system, having a transmitter for transmitting codewords which are derived from a digital signal, and a receiver for receiving codewords, the receiver including a decoder with a prediction filter which is excited by an input signal to produce an estimated digital signal. To improve reconstruction of the digital signal in the event of disturbances, the decoder includes a first switching circuit for switching off the input signal of the prediction filter when a disturbed codeword is received, and a second switching circuit for switching substitute values formed from previous values of the estimated digital signal instead of the estimated digital signal when the input signal is switched off.

12 Claims, 6 Drawing Sheets

DIGITAL TRANSMISSION SYSTEM WITH IMPROVED DECODER IN THE RECEIVER

BACKGROUND OF THE INVENTION

The invention relates to a digital transmission system, more particularly a mobile radio system comprising at least a transmitter for transmitting codewords which can be derived from a digital signal, and at least a receiver for receiving codewords, the receiver including a decoder with a prediction filter which is excited by an input signal to produce an estimated digital signal.

The invention further relates to a transceiver arrangement, more particularly a base station or a mobile station for such a digital transmission system, as well as a receiver, for such a transmission system.

Such a digital transmission system operates, for example, according to the so-called LD-CELP (=Low-Delay Code Excited Linear Prediction) speech coding algorithm, as this is described, for example, in EP 379 296 A2. An analog speech signal is then digitized in a coder at the transmitting end. Subsequently, in the transmitter this digital signal is converted into codewords by a coder and a decoder. These codewords are transmitted by the transmitter over a transmission channel, for example, in a mobile radio transmission system by an air interface to the receiver. In the receiver the codewords are converted into an estimated digital signal by means of the decoder and subjected to a postprocessing. The decoder in the transmitter and the decoder in the receiver then have identical structures and, if there is no disturbance, are also supplied with the same codewords so that, ideally, identical digital signals are produced as output signals i.e. the digitized speech signal at the transmitting end corresponds to the estimated digital signal at the receiving end. However, if the codewords to be transmitted are disturbed on the transmission channel, in a mobile radio transmission system, for example, by radio fading or dead spots caused by high-rise buildings, the decoder of the receiver is supplied with other codewords which do not correspond to the transmitted codewords. In consequence, disturbances are developed which are also subjectively perceivable.

SUMMARY OF THE INVENTION

It is an object of the invention to improve the quality of the estimated digital signal in the case of disturbances of the transmission channel.

This object is achieved in that the decoder comprises a first switching means for switching off the input signal of the prediction filter when a disturbed codeword is received and a second switching means for switching substitute values formed from previous values of the estimated digital signal instead of the estimated digital signal when the input signal is switched off.

The invention is then based on the recognition that in the case of disturbance i.e. when a disturbed codeword is received, more particularly in the case of group errors (with several successive disturbed codewords), the faulty reconstruction of the estimated digital signal in the decoder of the receiver is to be interrupted, so that the subjectively perceivable speech quality in the receiver remains relatively unchanged. Together with the switching-off of the input signal of the prediction filter in the decoder of the receiver, it is further necessary that substitute values are rendered available for the estimated digital signal. Surprisingly, it has appeared that the subjectively perceivable speech quality is experienced as relatively unchanged when-disturbances i.e. disturbed codewords occur, if the most recent sample values of the synthesis filter are substituted with already determined sample values of the estimated digital signal from the past. This may be effected by extrapolation in the prediction filter.

When speech signals are transmitted, an improvement of the subjectively perceivable speech quality can particularly be established if similar sample values to the estimated digital signal are used as substitute values.

A very good speech quality and a slight signal delay may be ensured in that the transmission system is provided for transmitting codewords according to the LD-CELP (Low-Delay Code Excited Linear Prediction) method.

A postprocessing of the estimated digital signal may be effected advantageously in that the receiver comprises a postfilter inserted downstream of the decoder.

The estimated digital signal may advantageously be reconstructed in that the prediction filter is arranged as an adaptive synthesis filter and in that an excitation signal is used as an input signal of the synthesis filter, a memory circuit for storing comparison codewords being arranged for producing the excitation signal.

The required memory capacity of the memory circuit may be restricted in that the memory circuit is formed by a first memory unit for storing a predefinable store of vectors of sample values and a second memory unit for storing weighting factors.

An effective control of the switching means may be ensured in that the receiver comprises an error detection device for detecting disturbed codewords and for driving the first and second switching means.

A practical embodiment for determining similar substitute values from the past may be effected in that not only a delay parameter featuring the time shift but also a weighting factor is provided for producing the substitute values.

Additional circuitry for storing further previous values and also circuitry for further computation time for determining an optimum delay parameter is avoided in that values determined by the postfilter are available for deriving the delay parameter and the weighting factor. For example, in the LD-CELP according to ITU-T Rec. G.728, the postfilter renders both the delay parameter, a weighting factor and an extended state memory available.

A further quality improvement specially at the beginning of harmonic signal segments may be achieved in that the current speech spectrum is provided for weighting the error spectrum developing in the output signal of the postfilter.

These and other aspects of the invention will be apparent from and elucidated with reference to the embodiments described hereinafter.

DESCRIPTION OF THE PREFERRED EMBODIMENT

Figure 1:
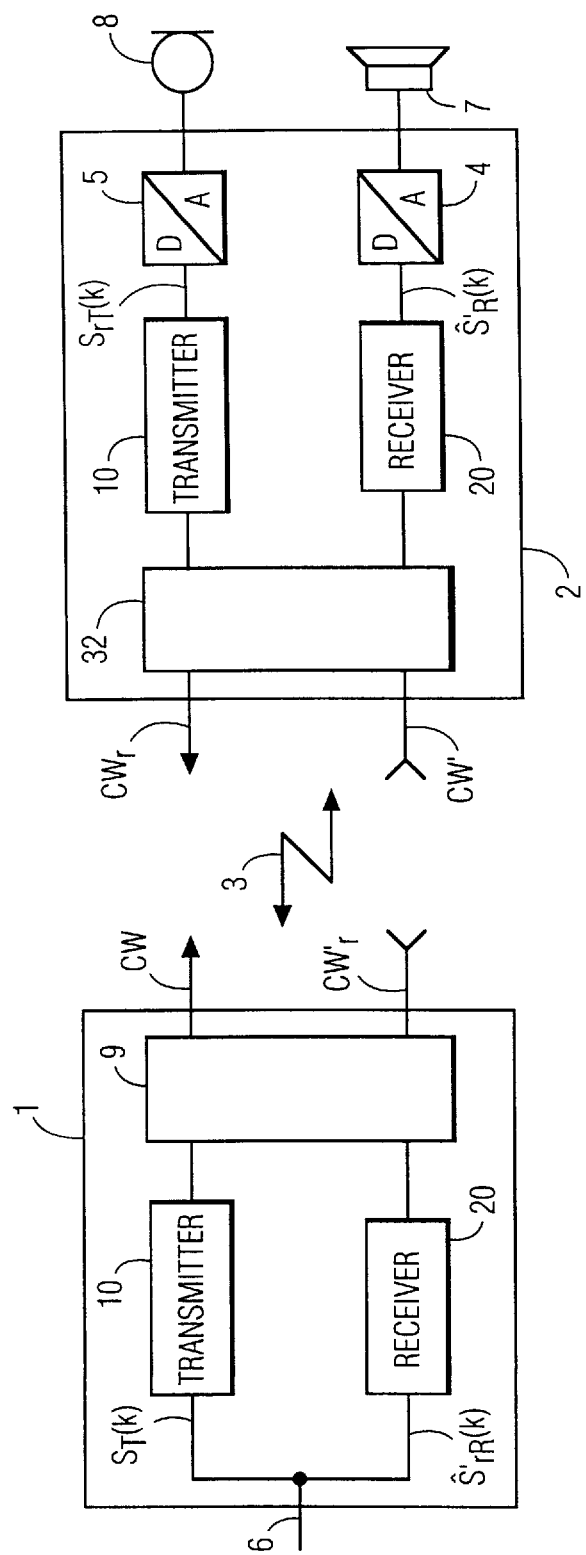
FIG. 1 shows an illustrative embodiment for a radio transmission system comprising a base transceiver station and a mobile station.

FIG. 1 shows as a block circuit diagram an illustrative embodiment for a radio transmission system comprising a base transceiver station 1 and a mobile station 2. Via a transmission channel 3 i.e. the air interface, codewords CW are transmitted from a transmitter 10 of the base transceiver station 1 to a receiver 20 of the mobile station 2 and received as codewords CW' by the receiver 20 of the mobile station. From the received codewords CW' the receiver 20 of the mobile station 2 forms a reconstructed digital signal $\hat{s}_R'(k)$ which is conveyed to a loudspeaker after a digital/analog conversion. In a reverse transmission direction, speech signals received by a microphone 8 are digitized by a digital/analog converter 5 and, after the conversion of the digital signal to codewords $CW_r$, they are transmitted by the transmission channel 3 to the base transceiver station 1 by the transmitter 10 of the mobile station 2. These codewords are received as codewords $CW_r'$ in the receiver 20 of the base station 1 and converted to a reconstructed digital signal $\hat{s}_{rR}'(k)$. This reconstructed signal is transmitted by a connecting line 6, for example, in digitized form, to switching facilities of the public telephone network.

Figure 2:
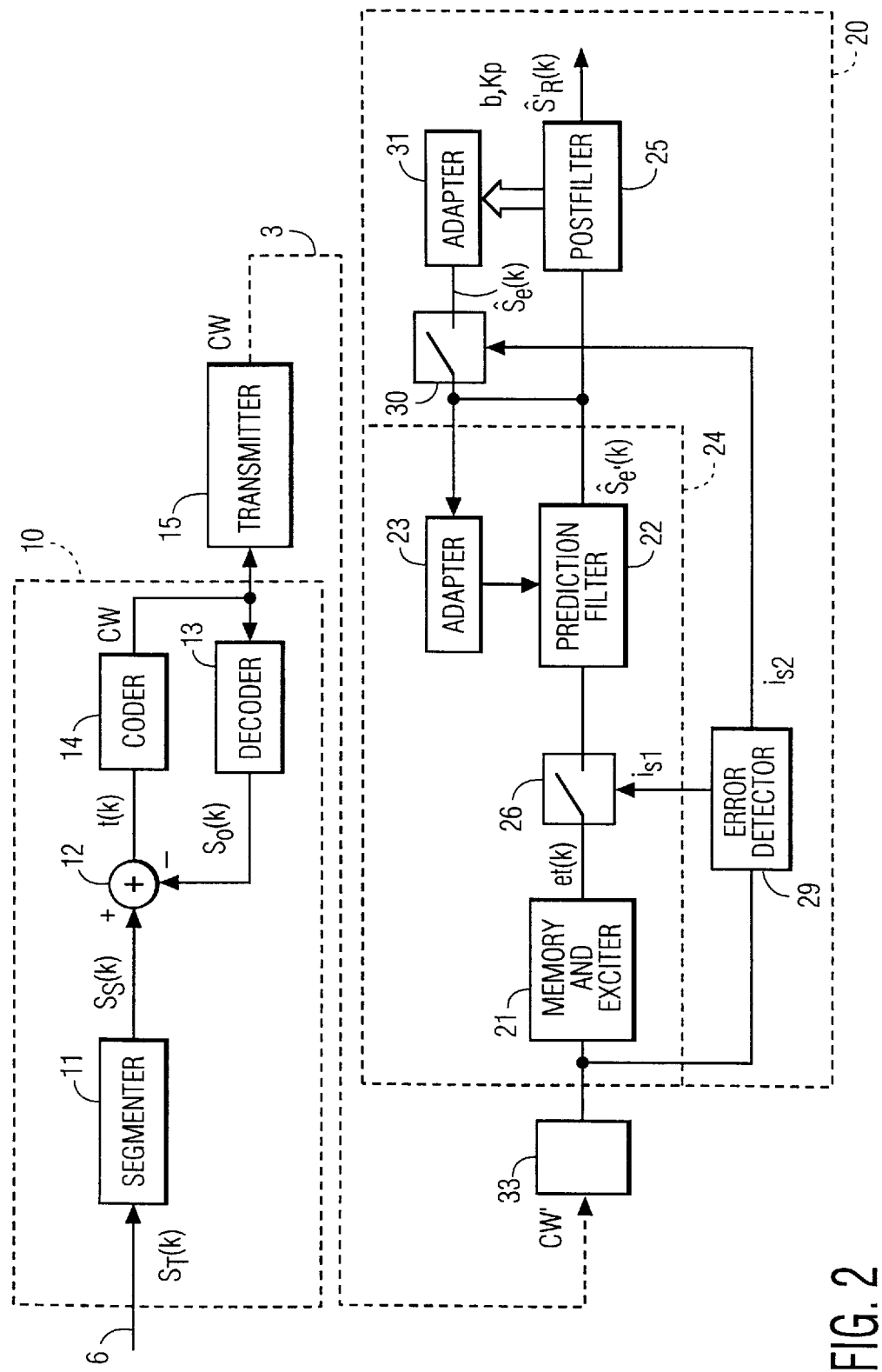
FIG. 2 shows an illustrative embodiment for a transmission system comprising a transmitter and a receiver.

FIG. 2 shows a block circuit diagram of an illustrative embodiment for a transmission system comprising a transmitter 10 and a receiver 20 as they are used, for example, in the mobile radio transmission system shown in FIG. 1 in the base station and the mobile station. The receiver 10 in the illustrative embodiment shown in FIG. 2 comprises a segmenting device 11 to which is applied a digital signal $s_T(k)$, for example, by a connecting line 6 of the public telephone network. The transmitter 10 further includes a coder 14 as well as a decoder 13. A signal available on the output of the coder 14 which signal is formed by codewords CW to be transmitted, is also applied to the decoder 13. The decoder 13 forms from the codewords CW a signal $s_o(k)$ which is subtracted from the output signal $s_s(k)$ on the output of the segmenting unit 11 by means of an adder 12. On the output of the adder 12 is available a difference signal to be referenced target vector t(k).

The codewords CW' received over the transmission channel 3 are applied to a decoder 24 in the receiver 20 which decoder forms an estimated digital signal $\hat{s}_e'(k)$ which is an approximate copy of the digital signal $s_o(k)$ available in the transmitter from the transmitted codewords CW. The receiver 20 further includes a postfilter 25 which converts the estimated digital signal $\hat{s}_e'(k)$ into an reconstructed digital signal $\hat{s}_R'(k)$ of the postfilter 25. The decoder 24 of the receiver 20 comprises a memory and excitation unit 21, a first switching means 26, a prediction filter 22, an adapting circuit 23, a second switching means 30, an adapting circuit 31 as well as an error detection unit 29. The memory and excitation unit 21 produces an excitation signal et(k) for the prediction filter 22 when the first switching means 26 is closed. The prediction filter 22 reconstructs an estimated digital signal $\hat{s}_e'(k)$ from the excitation signal et(k), whereas the adapting circuit 23 performs an adaptation to produce the coefficients of the prediction filter 22. When the first switching means 26 is open and the second switching means 30 is closed, the postfilter 25 is not supplied with the output signal $\hat{s}_e'(k)$ of the prediction filter 22, but with substitute values $\hat{s}_e(k)$ formed from previous values of the estimated digital signal $\hat{s}_e'(k)$. For this purpose, a delay parameter kp, a weighting factor b, as well as the necessary state variables $\hat{s}'$ are rendered available for the extrapolation means 31 by the postfilter 25. As explained below, the extrapolation means 31 function as a substitute signal generating means.

The digital radio transmission system represented in FIG. 2 operates with the LD-CELP (Low-Delay Code Excited Linear Prediction) speech coding algorithm. This method was accepted in May 1992 as ITU-T (previously CCITT) Standard G.728. However, this coding algorithm is relatively data-intensive and of interest for only few fields of application such as, for example, in the field of video due to the relatively high power consumption and required memory capacity. A more cost-effective version was stated in the annex of Recommendation G.728 of ITU-T. This more cost-effective version is also interesting to mobile radio transmission systems although, compared to the RPE-LTP Codec used in the GSM Codec, the circuitry and cost are still considerably higher. The advantage, however, of the LD-CELP is the eminent speech quality and the small signal delay. By means of the invention it is possible to adapt the LD-CELP Codec and its advantages to the specific problems with respect to the transmission by a transmission channel of a mobile radio system and fully utilize the advantages of this Codec. Therefore, no modifications are necessary in the receiver 20 at the transmitting end. For example, the transmitter 10 according to the basic principle of the LD-CELP comprises the segmenting means 11 which converts the digital signal $s_T(k)$ into a digital signal $s_s(k)$ formed by five sample values. The segmented digital signal $s_s(k)$ which has a bit rate of, for example, 64 kbit/s is converted by the downstream coder 14 and decoder 13 into a codeword signal CW which has a bit rate of, for example, 16 kbit/s. The transmitting arrangement 15 transmits the thus coded codeword signal CW by the transmission channel 3 to the receiver 20. Barring coding and transmission errors, the codeword signal CW' received by the receiver 20 corresponds to the transmitted codeword signal CW.

Figure 4:
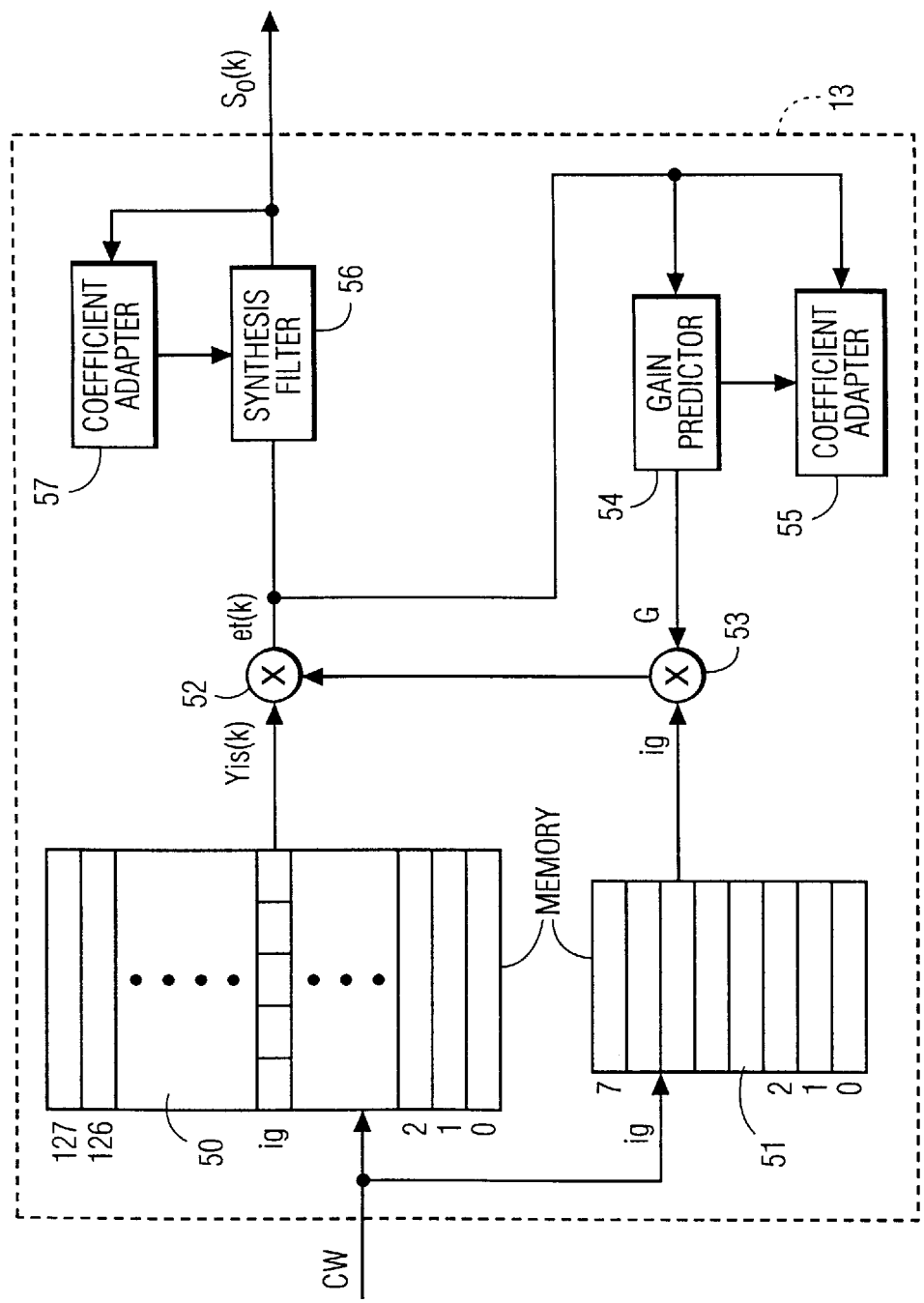
FIG. 4 shows an illustrative embodiment for a decoder included in the transmitter.
Figure 5:
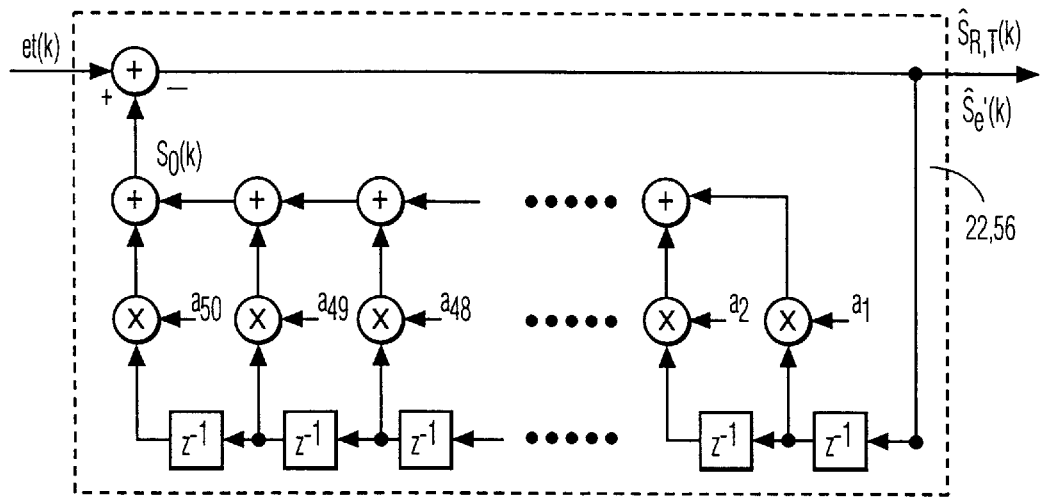
FIG. 5 shows an illustrative embodiment for a prediction filter included in the receiver decoder.
Figure 6:
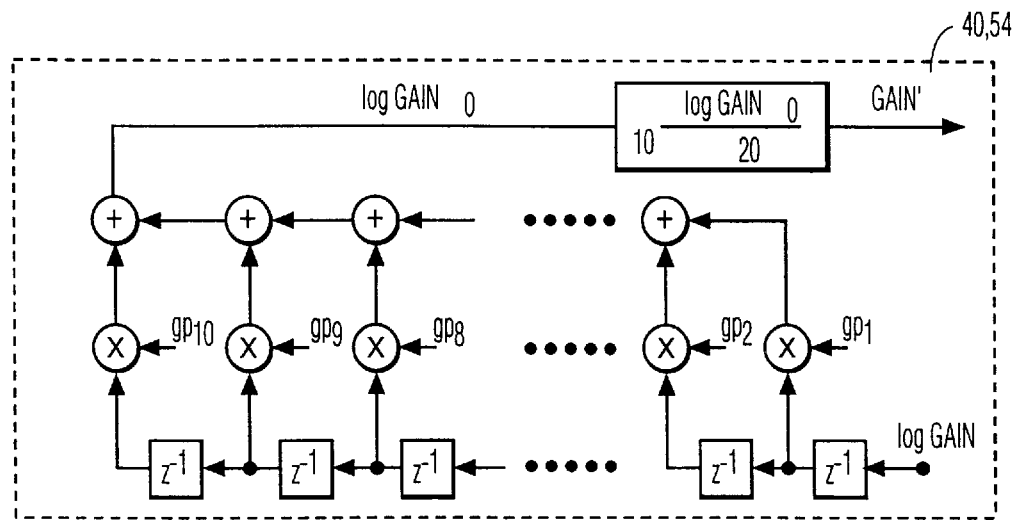
FIG. 6 shows a gain predictor circuit used in the decoder of FIGS. 3 and 4.
Figure 7:
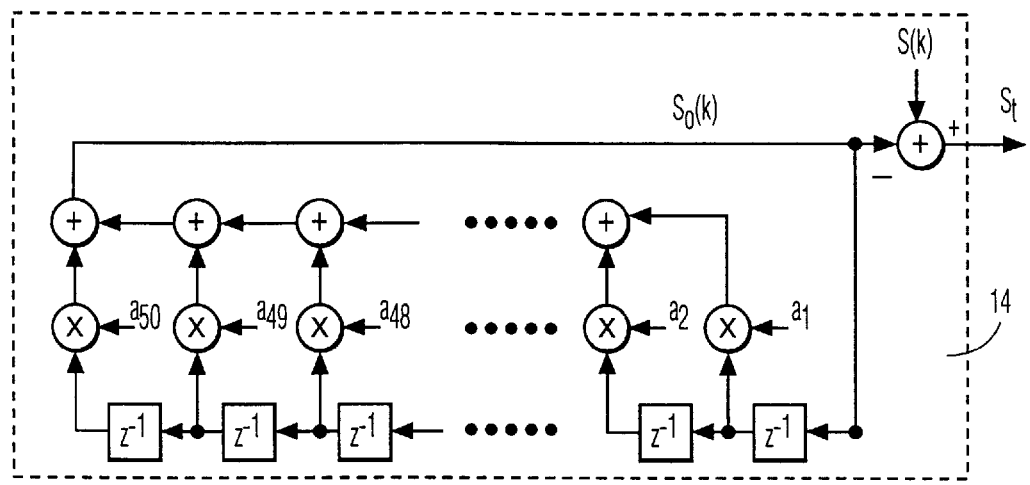
FIG. 7 shows a filter used in the transmitter decoder of FIG. 2.

The decoder 24 of the receiver 20 decodes the received codeword signal CW' also with the aid of an adaptive prediction filter 22. The resulting estimated digital signal $\hat{s}_e'(k)$ is available on the output of the decoder 24. For example, an adaptive prediction filter of degree 50= (synthesis filter: compare FIG. 5) is used for reconstructing this signal $\hat{s}_e'(k)$. The filter coefficients for the prediction filter 22 are derived from the estimated signal $\hat{s}_e'(k)$ by the adapting circuit 23 for example, as shown in FIG. 5, these are the coefficients $a_1 \ldots a_{50}$. The excitation signal et(k) of the synthesis filter 22 is taken from a vector $y_{is}(k)$ of five sample values which vector is selected from a fixedly stored number of, for example, 128 vectors which are stored in the memory and excitation circuit 21. Furthermore, a weighting factor whose formation is further described with reference to FIG. 4 is used for generating the excitation signal et(k). A detailed description of the mode of operation of such an adaptive prediction filter is given, for example, in "Linear Prediction" Markel and Grey, Linear Prediction of Speech, Springer Verlag Berlin, 1976. The estimated digital signal $\hat{s}_e'(k)$ formed by the prediction filter 22 is subjected once again to a postprocessing in the postfilter 25. The mode of operation of the decoder 24 has thus far related to the case where the switch 26 is closed and the switch 30 is open. In this case the error detection device 29 sends an appropriate control signal to the first switching means 26 and the second switching means 30. In this operating state the received codewords CW' are not disturbed.

If, however, the received codewords CW' are disturbed, as often happens in a mobile radio system when a radio fading area is driven through, in the operating state described above of the decoder (first switching means 26 closed, second switching means 30 open), the decoder 24 of the receiver 20 would be fed with a parameter CW' of the received codewords which is different from that of the decoder 13 of the transmitter 10. In consequence, also the filter coefficients of the two prediction filters in the transmitter 10 and in the receiver 20 would be undesirably adjusted, so that the state variables of the two decoders 13, 24 would diverge. Although it is ensured via loss factors that the state variables converge again within about 300 ms, the disturbing influence as a result of disturbed codewords CW' would be subjectively perceivable in the receiver 20. As a result of operation of the first and second switching means 26 and 30 respectively, as well as the substitute signal generating means 31, the state variables of the prediction filter of the decoder 24 of the receiver 20 are adjusted to the respective variables in the transmitter 10 when a transmission error occurs, so that the subjectively perceivable disturbance is minimized.

For driving the first and second switching means 26 and 30 respectively, it is only necessary for the transmission channel 3 to render redundance bits available, so that a disturbed codeword CW' is also recognized as such at the receiving end. Known methods for channel coding which do not depend on the subject of the present invention can be used for this purpose. In the following there is only presupposed that the error detection means 29 are capable of detecting whether a disturbed codeword CW' was received.

Therefore, the invention is based on the recognition that as soon as undisturbed codewords CW are followed in the receiver by a disturbed codeword CW', the resulting output signal of the prediction filter $\hat{s}_e'(k)$ will more closely resemble the signal $s_o(k)$ produced in the transmitter 10 when the state variables and the filter coefficients of both the prediction filter and the gain predictor in the memory circuit 21 (compare FIG. 3) of the two decoder sections differ less. It is thus desirable that the filter coefficients of the prediction filter 22 differ the least possible from the respective values of the decoder 13 in the transmitter 10 after a disturbed codeword CW' has been received. However, as the filter coefficients are derived from the state variables, it should therefore be tried in the first instance to render suitable state variables $\hat{s}_R'(k)$ available to the prediction filter 22 also in the case of disturbed codewords CW'. Surprisingly it has appeared that this requirement can be taken into account when previous values of the estimated digital signal $\hat{s}_e'(k)$ are used. Therefore, in the digital transmission system shown in FIG. 2, when a disturbed codeword CW' is received in the receiver 20, the five most recent sample values of the prediction filter 22 are not determined by entering a then erroneous signal et(k), but substituted with very similar sample values $\hat{s}_e(k)$ from the past of $\hat{s}_R'(k)$. In the decoder 24 of the receiver 20 this is achieved in that the switch of the first switching means 26 is open and the switch of the second switching means 30 is closed. In that case, the output of the prediction filter 22 presents substitute values $\hat{s}_e(k)$ generated by the substitute value generator 31, which are determined, for example, according to the following expression:

$$\hat{s}_e(k) = b \times \hat{s}_{R(k-kp)}$$

where kp features a delay parameter and b a weighting factor. This optimum signal $\hat{s}_e(k)$ may be determined, for example, according to a generally known method for error minimization according to the following expression:

$$E = \sum_{i=1}^{L} [\hat{s}(k-i) - b \times \hat{s}(k-i-k)]^2,$$

where L is the mean length and k customarily varies in the range between 16 and 140.

In the illustrative embodiment shown in FIG. 2, the postfilter 25 is inserted in the receiver 20 downstream of the decoder 24. In such an embodiment of the receiver, an extension of the state memory for storing the past values as well as the computation time for computing the optimum shift parameter kp may be omitted, because in the LD-CELP according to ITU-T Rec. G.728 a postfilter is already included which designates both the delay parameter kp and a weighting factor b in Recommendation G.728 as ptap, and also an extended state memory (in Recommendation G.728 as field ST(240) is rendered available. In that case, however, it is recommended not to substitute the weighting factor b directly with ptap, but with γ ptap, where γ is selected<1. For the rest, there could be a danger that a non-fading harmonic signal is generated if there is a rather long disturbance, because ptap in the postfilter may adopt the value 1.0.

Figure 3:
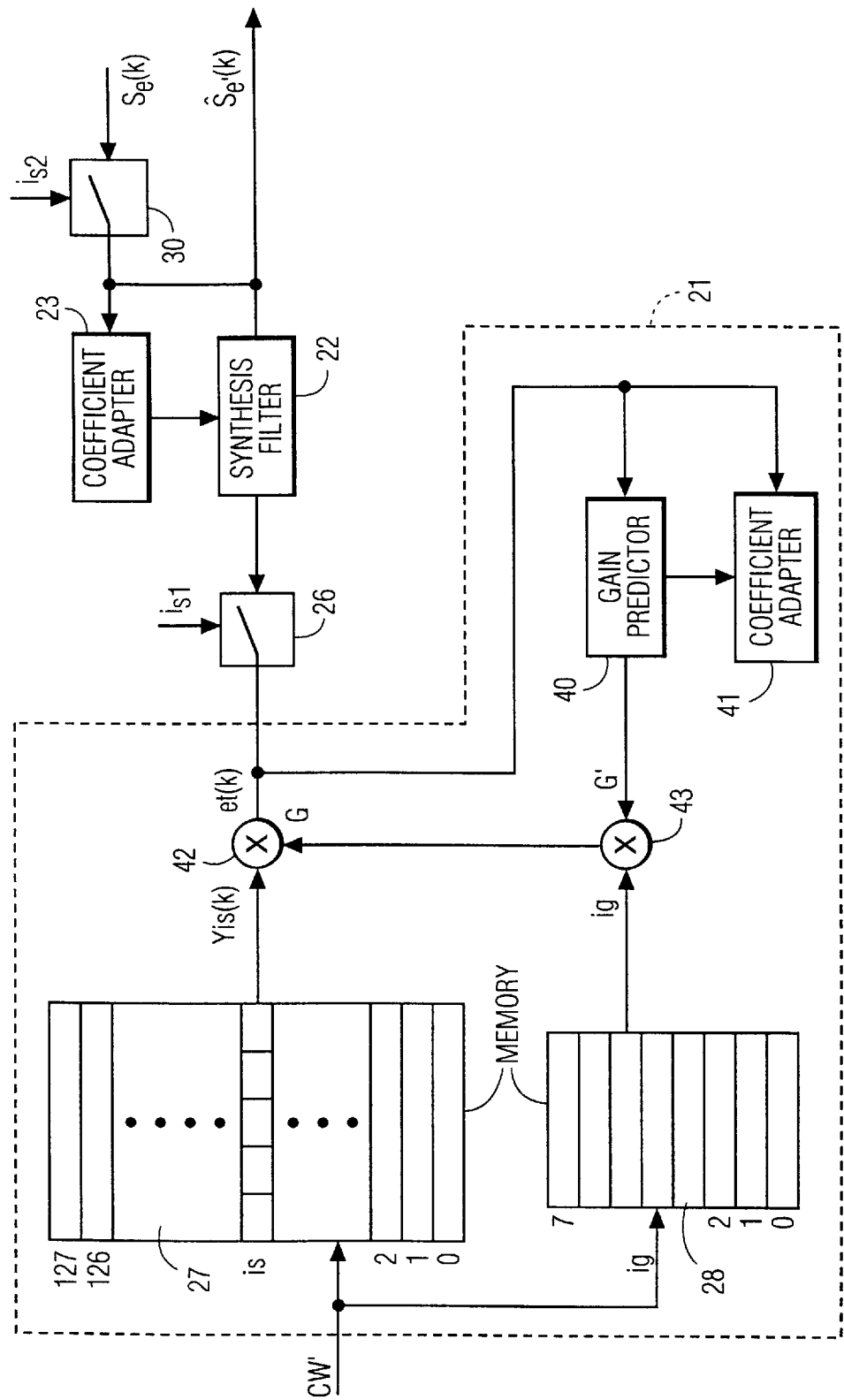
FIG. 3 shows an illustrative embodiment for a decoder included in the receiver.

The decoders shown in FIGS. 3 and 4 differ only in the switches 26 and 30. They include first memory units 27, 50 and second memory units 28, 51. The first memories store predefined vectors $y_{is}(k)$. A selected vector is multiplied in a first multiplier by a gain-modified weighting factor, to produce the excitation signal et(k). This signal is an input to the prediction filter (synthesis filter) 22, 56, through the switch 26 or directly, and also is an input to a gain predictor circuit 40, 54 and a coefficient adapter circuit 41, 55. Each coefficient adapter circuit provides a second input to the corresponding gain predictor circuit, whose output is provided to a second multiplier 43, 53. Each second memory stores weighting factors ig. When multiplied by the output from gain predictor circuits 40, 54 in multipliers 43, 53, the weighted gain prediction signal becomes the other input to the first multiplier 42, 52. The outputs of the synthesis filters 22, 56 respectively provide the estimated digital signal $\hat{s}_e'(k)$ and the signal $s_o(k)$.

The practical use of substitute values $\hat{s}_e(k)$ formed from the reconstructed digital signal $\hat{s}_R'(k)$ from previous values may be effected by extrapolation in the prediction filter 22, for example as shown in the conventional 50 stage adaptive prediction filter shown in FIG. 5. To sum up there may be observed that the basic principle of the decoder 24 according to the invention, in the case of a disturbed codeword CW', consists of substituting a vector, delayed by kp, of the (undisturbed) residual signal for the current vector of $\hat{s}_R'(k)$ having the current spectrum.

This method of extrapolating the signal $\hat{s}_R(k)$ in the event of codewords CW' that are detected as received faultily already yields good results, but the quality may be further improved if especially at the beginning of harmonic signal segments the developing error spectrum is weighted with the current speech spectrum. A known method in this respect is, for example:

$$A(z) = 1 - P(z) = 1 + \sum_{i}^{L} a_i \times z^{-i}$$

Such a filtering of the speech segment with the inverse frequency response then yields the so-called residual signal i.e. the error between the current and the predicted speech signal. This residual signal in practice has at least approximately a white spectrum. The filtering of the residual signal with 1/A(z) finally yields the original speech signal. Errors previously applied to the residual signal are weighted with the spectral envelope of the speech signal and thus hidden from the human auditory system. Summarizing, this further improvement consists of a residual signal vector delayed by kp being substituted for the current vector of $\hat{s}_R(k)$ having the current spectrum if disturbed codeword CW' occurs.

Simulations have shown that in the event of disturbances of about 3% of all the transmitted codewords CW, the quality of the reconstructible signal $\hat{s}_R(k)$ can hardly be distinguished from the undisturbed codeword.

We claim:

1. A digital transmission system comprising:
   a transmitter, having an input for receiving a digital signal, for transmitting codewords derived from the digital signal, and
   a receiver, comprising an input for receiving codewords transmitted by the transmitter, and a decoder for decoding the received codewords, the decoder including a prediction filter, the prediction filter being excited by an input signal based on the received codewords and producing an estimated digital signal, characterized in that the decoder comprises:
      first switching means for switching off the input signal excitation to the prediction filter when a disturbed codeword is received at the receiver input, and
      second switching means for substituting substitute values formed from previous values of the estimated digital signal, instead of an estimated digital signal based on the disturbed codeword, when the input signal excitation is switched off.

2. A system as claimed in claim 1, characterized in that said estimated digital signal is formed by sample values, and similar sample values are used as said substitute values.

3. The transmission system as claimed in claim 1, characterized in that the transmission system for transmitting codewords (CW) operates according to the LD-CELP (Low-Delay Code Excited Linear Prediction) method.

4. The transmission system as claimed in claim 1, characterized in that the receiver comprises a postfilter (25) inserted downstream of the decoder (24).

5. The transmission system as claimed in claim 1, characterized in that the prediction filter (22) is arranged as an adaptive synthesis filter and in that an excitation signal is used as an input signal (et(k)) of the synthesis filter (22), a memory circuit (21) for storing comparison codewords being arranged for producing the excitation signal (et(k)).

6. The transmission system as claimed in claim 1, characterized in that the memory circuit (21) is formed by a first memory unit (27) for storing a predefinable store of vectors ($y_{is}(k)$) of sample values and a second memory unit (28) for storing weighting factors (ig).

7. The transmission system as claimed in claim 1, characterized in that the receiver (20) comprises an error detection device (29) for detecting disturbed codewords (CW') and for driving the first and second switching means (26, 30, respectively).

8. The transmission system as claimed in claim 1, characterized in that not only a delay parameter (kp) featuring the time shift but also a weighting factor (b) is used for generating the substitute values ($\hat{s}_e(k)$).

9. The transmission system as claimed in claim 1, characterized in that the receiver comprises a postfilter (25) according to ITU-T Rec. G.728 inserted downstream of the decoder (24) and in that for deriving the delay parameter (kp) and the weighting factor (b) values are available determined by the postfilter (25).

10. The transmission system as claimed in claim 1, characterized in that the current speech spectrum is provided for weighting the error spectrum developing in the output signal ($\hat{s}'(k)$) of the postfilter (25).

11. A mobile radio system transceiver, comprising:
   a receiver, having an input for receiving transmitted first codewords derived from a first digital signal, and a decoder for decoding the first codewords, the decoder including a prediction filter, the prediction filter being excited by an input signal based on the first codewords and producing an estimated digital signal, and
   a transmitter, having an input for receiving a second digital signal, for transmitting second codewords derived from the second digital signal,
   characterized in that the decoder comprises:
      first switching means for switching off the input signal excitation to the prediction filter when a disturbed codeword is received at the receiver input, and
      second switching means for substituting substitute values formed from previous values of the estimated digital signal, instead of an estimated digital signal based on the disturbed codeword, when the input signal excitation is switched off.

12. A digital mobile radio system receiver comprising:
   an input for receiving transmitted codewords derived from a digital signal, and
   a decoder for decoding the received codewords, the decoder including a prediction filter, the prediction filter being excited by an input signal based on the received codewords and producing an estimated digital signal, characterized in that the decoder comprises:
      first switching means for switching off the input signal excitation to the prediction filter when a disturbed codeword is received at the receiver input, and
      second switching means for substituting substitute values formed from previous values of the estimated digital signal, instead of an estimated digital signal based on the disturbed codeword, when the input signal excitation is switched off.

* * * * *